(12) United States Patent
Yee et al.

(10) Patent No.: US 11,907,780 B2
(45) Date of Patent: Feb. 20, 2024

(54) PAYMENT CARD WITH AN INTEGRATED DOOR

(71) Applicant: Capital One Services, LLC, McLean, VA (US)

(72) Inventors: Bryant Yee, Silver Spring, MD (US); Tyler Maiman, Melville, NY (US); Cruz Vargas, Ocean Springs, MS (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/863,503

(22) Filed: Jul. 13, 2022

(65) Prior Publication Data

US 2024/0020500 A1     Jan. 18, 2024

(51) Int. Cl.
| | |
|---|---|
| *G06K 19/02* | (2006.01) |
| *G06K 19/077* | (2006.01) |
| *G06K 19/07* | (2006.01) |
| *B42D 25/45* | (2014.01) |
| *B42D 25/23* | (2014.01) |
| *B42D 25/36* | (2014.01) |
| *B42D 25/22* | (2014.01) |

(52) U.S. Cl.
CPC .......... *G06K 19/025* (2013.01); *B42D 25/22* (2014.10); *B42D 25/23* (2014.10); *B42D 25/36* (2014.10); *B42D 25/45* (2014.10); *G06K 19/0723* (2013.01); *G06K 19/07722* (2013.01)

(58) Field of Classification Search
CPC .............................. G06K 19/025; B42D 25/22
USPC .......................................................... 235/382
See application file for complete search history.

(56) References Cited

U.S. PATENT DOCUMENTS

| | | | |
|---|---|---|---|
| 5,700,037 A | 12/1997 | Keller | |
| 7,658,332 B1* | 2/2010 | Adams | G06K 19/02 235/488 |
| 7,721,956 B2* | 5/2010 | Williams | G06K 19/04 235/487 |
| 8,550,362 B2* | 10/2013 | Cowcher | G06F 9/4406 235/487 |
| 10,748,167 B1* | 8/2020 | Rider | G06F 21/77 |
| 11,230,136 B1* | 1/2022 | Legge | G07D 7/121 |
| 11,455,506 B1* | 9/2022 | Maiman | G06K 19/0772 |
| 2004/0089724 A1* | 5/2004 | Lasch | A45C 11/321 235/487 |
| 2005/0205665 A1* | 9/2005 | Lasch | B42D 25/00 235/492 |
| 2007/0252010 A1 | 11/2007 | Gonzales et al. | |

(Continued)

*Primary Examiner* — Allyson N Trail
(74) *Attorney, Agent, or Firm* — Perkins Coie LLP

(57) ABSTRACT

Disclosed embodiments pertain to a payment card with an integrated door. A top layer can be affixed to a bottom semirigid layer. The top layer can include a first portion attached to the front face of the bottom layer and a second portion, or door, coupled to the first portion in a manner that allows the second portion to rotate to and from an open position and closed position. The bottom layer can include a cardholder name, account number, expiration date, and security code hidden from view when the door is in the closed position. A fastener can also be added to secure the door in an open position, closed position, or both. In one embodiment, the payment card can include an antenna for contactless transactions, and the door's position can control the antenna's availability for wireless communication.

20 Claims, 7 Drawing Sheets

(56) References Cited

U.S. PATENT DOCUMENTS

| | | | |
|---|---|---|---|
| 2008/0257966 A1* | 10/2008 | Britt | G06K 19/07726 |
| | | | 705/17 |
| 2017/0202327 A1* | 7/2017 | Watkins | B42D 25/23 |
| 2020/0034825 A1* | 1/2020 | Levy | G06Q 20/354 |
| 2021/0256339 A1* | 8/2021 | Moncada | G06K 19/0721 |
| 2021/0350194 A1* | 11/2021 | Montealegre | G07F 7/086 |
| 2022/0067312 A1* | 3/2022 | Colby | G06Q 20/352 |
| 2022/0335406 A1* | 10/2022 | Xu | G06F 3/0488 |

\* cited by examiner

PAYMENT CARD WITH AN INTEGRATED DOOR

BACKGROUND

A payment card, such as a debit or credit card, is a mechanism that enables expeditious payment of merchants for goods and services electronically. A credit card is a payment method that enables a cardholder to pay a merchant based on a promise to pay the card issuer and any other charges. The card issuer (e.g., a bank) grants a line of credit to the cardholder from which the cardholder can borrow money to pay a merchant. A cardholder can also use a debit card to make purchases. Unlike a credit card, money for the purchase must be in the cardholder's bank account and immediately transferred from the account to a merchant's account. A cardholder can present a debit or credit card to a merchant through a merchant payment terminal that can acquire card information from a magnetic stripe or wireless communication. Alternatively, a cardholder can manually enter the card information.

A payment card is a small rectangular structure comprised of plastic or metal. In one instance, the card comprises several layers of plastic laminated together. A magnetic stripe is typically added to the back of the card to enable data encoding that a payment terminal can read. Further, a signature panel is often added to a card to document an owner's handwriting. Payment information, such as the cardholder's name, account number, expiration date, and security code, is typically printed or embossed on the payment card. Furthermore, some payment cards include an embedded microchip to aid in fraud prevention by creating a unique code for each sales transaction. Further yet, contactless payment is enabled by embedding an antenna into the card.

SUMMARY

The following presents a simplified summary to provide a basic understanding of some aspects of the disclosed subject matter. This summary is not an extensive overview. It is not intended to identify necessary elements or to delineate the scope of the claimed subject matter. Rather, this summary presents some concepts in a simplified form as a prelude to the more detailed description presented later.

Briefly described, disclosed embodiments relate to a payment card with an integrated door. The door can be attached to a card core with a hinge that allows the door to move about an axis of rotation provided by the hinge relative to the card core. Payment information, such as account holder name, account number, expiration date, and security code, can be positioned behind the door when closed, thereby hiding or covering the information from view. The door can rotate one hundred and eighty degrees in one instance and reveal the payment information when desired. The payment card can also include a notch or aperture in the door or card core to aid a user in moving the door. In one embodiment, the hinge can correspond to a spring hinge that automatically opens the door when unlatched from a closed position. In addition, a magnetic stripe can be included with the payment information hidden by a closed door to allow a payment terminal to acquire information associated with a primary or secondary account. Further, various position securing mechanisms or fasteners can be employed to secure the door in a closed or open position.

According to one aspect, disclosed embodiments may include a payment card comprising a bottom semirigid structure comprising a length, parallel lengthwise edges, a bottom front face, and bottom back face, payment information visually presented on a first portion of the bottom front face comprising a cardholder name, account number, expiration date, and security code, and a top semirigid structure overlaid on the bottom front face including a door within a portion of the top structure that is movable around a rotational axis from a closed position that covers the payment information to an open position that reveals the payment information. The payment card can comprise a hinge between the top structure and the door. In one instance, the hinge is a living hinge. The hinge can further correspond to a spring hinge that aids in opening the door automatically and a closing mechanism that holds the door in the closed position. The closing mechanism can correspond to a latch, button, Velcro, or magnet. The door can further include a weight to allow the door to stay in the closed and open positions. Further, the payment card can comprise a first magnetic stripe on the front portion of the bottom front face that is covered by the door when in a closed position. The payment card can also comprise a second magnetic stripe on the bottom back face. In one instance, the first magnetic stripe and the second magnetic stripe include different payment information associated with a primary and secondary payment account. The payment card can further comprise an antenna activated for contactless interaction after the door's movement from closed to open.

In accordance with another aspect, disclosed embodiments may include a method of producing a payment card. The method comprises affixing a top layer onto a bottom semirigid structure comprising a length, parallel lengthwise edges, width, parallel widthwise edges, a bottom front face, and a bottom back face, in which the top layer includes a moveable door that rotates between an open position and a closed position, and adding account information on a portion of the bottom front face covered by the moveable door when in the closed position. The method further comprises adding a first magnetic stripe to the bottom back face and adding a second magnetic stripe to the portion of the bottom front face. Further, the method comprises coupling the door to a second portion of the top layer with a hinge. The method can also involve cutting a notch in an edge of the door that allows a fingernail to open the door. Further, the method comprises adding weight to the door that holds the door in the closed position or open position. The method further comprises adding an antenna to one of the top layer or the bottom layer for contactless communication and adding an activation circuit to the door that activates and deactivates the antenna based on the door position.

According to yet another aspect, disclosed embodiments can include a transaction card apparatus comprising a bottom semirigid layer comprising a length, parallel lengthwise edges, a bottom front face, and bottom back face, and a top semirigid layer comprising a first portion attached to the bottom front face and a second portion that is attached to the first portion with a living hinge that enables the second portion to rotate from a closed position that covers the bottom back face to an open position that reveals the bottom back face. The apparatus can also comprise an integrated circuit chip and an antenna coupled to the chip and the second portion. In this instance, the antenna is operable to acquire or transmit information when the second portion is in an open position and inoperable to acquire or transmit information when the second portion is in the closed position.

To accomplish the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Conventional payment cards include numerous fraud prevention mechanisms. For instance, a payment card can include a signature pattern, microchip, and security code. However, fraud can still occur with the payment information printed or embossed on a payment card, such as the cardholder's name, account number, expiration date, and security code. A fraudster can obtain the payment information by viewing or photographing the payment card and use the payment information to make fraudulent purchases. The growing prevalence of high-resolution cameras in public places increases the ease and thus the likelihood of this type of fraud.

Disclosed embodiments may include integrating within a payment card a door to hide sensitive payment information, such as the cardholder's name, card number, expiration date, and security code. The payment information can be hidden by the door when the card is not actively in use, limiting the time the information is visible. Even when open, the door can make viewing or photographing payment information more difficult than a conventional payment card. Additionally, the door can prevent the outdated and insecure practice of making a carbon copy imprint of a payment card still utilized by many hotels. One embodiment can include integrating a hinge (e.g., living hinge, butt hinge, ball-bearing hinge, barrel hinge, offset hinge, piano hinge) to rotatably couple the door to a card structure. In one instance, the hinge can be positioned at approximately half the length of the card, allowing the cover to move one-hundred and eighty degrees. In one embodiment, the door can also include a torsion spring, such as part of a spring-loaded hinge, which assists the cover in rotating when the cover is opened, for example, with a button or latch. In another embodiment, the door can be held in an open or closed position with a magnet, added weight, or snap, among other things. Further, an aperture or slot can be embedded within the card to aid in opening the door, for example, with a finger. Further yet, a payment card can include an antenna for contactless payment that can be activated or deactivated for use based on the position of the door.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
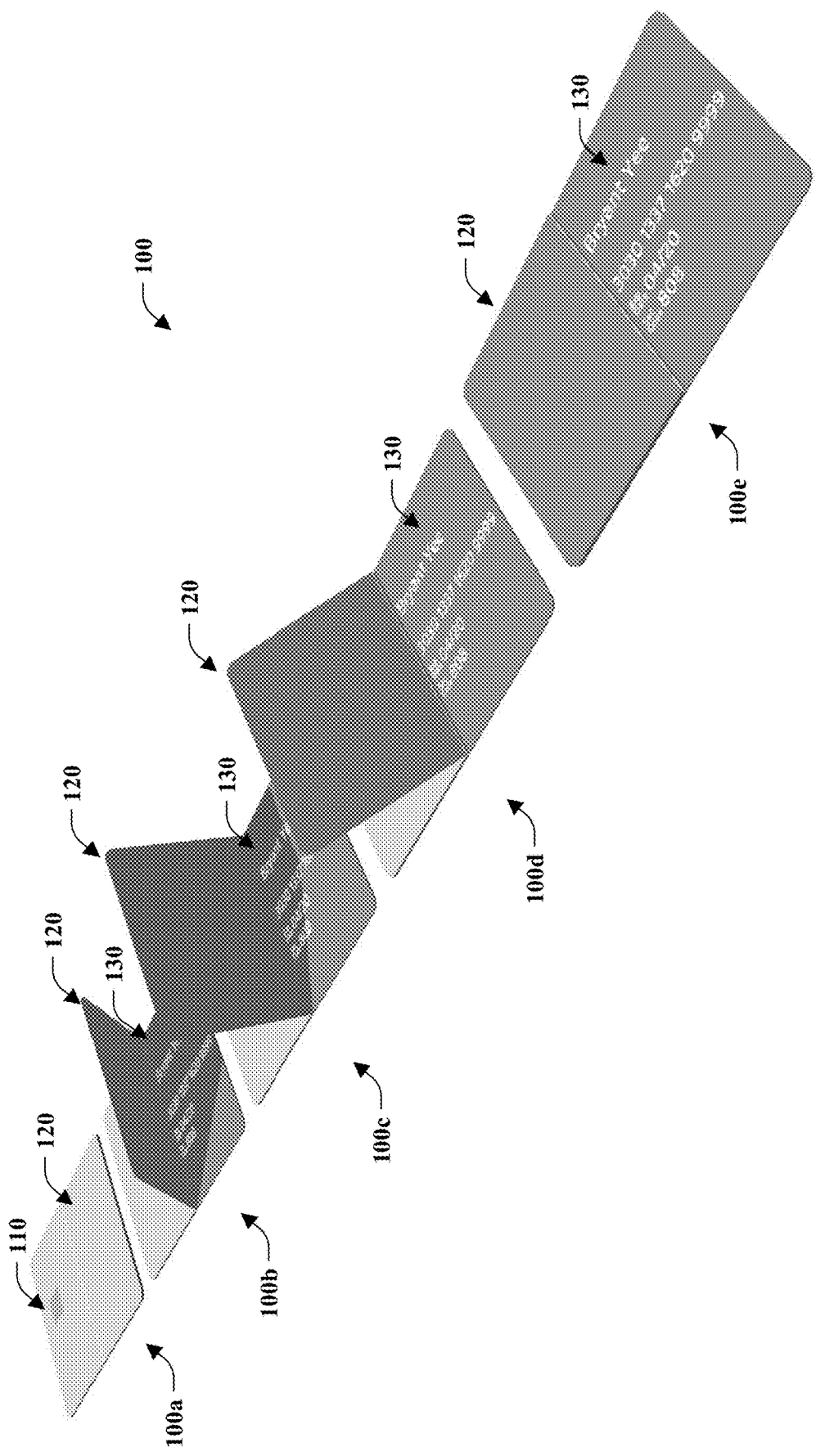
FIG. 1 illustrates an isometric view of a payment card with a door in several configurations.

Referring initially to FIG. 1, an isometric view is provided of a payment card 100 with a door 120 in various positions in accordance with one embodiment. FIG. 1 does not illustrate all door positions but rather a subset of positions to aid clarity and further discussion. Further, the payment card 100 and door 120 positioning is not limited to that depicted and described as other embodiments are possible.

Card configuration 100a includes a substantially flat card structure with a size and thickness of conventional payment cards (e.g., 3.375 in×2.125 in×0.03 in). As illustrated, the card configuration 100a includes an integrated circuit chip or microchip 110 that can be layered on top of a bottom or base layer. The microchip 110 can correspond to an EMV (Euro pay, MasterCard, Visa) chip that to facilitates use of a personal identification number (PIN) to complete a transaction. Further, the card configuration 100a includes a door 120 in a down or closed position parallel to the bottom layer. As shown, the door 120 can occupy about fifty percent of the length of the card in this embodiment. Further, a hinge can be integrated across the width of the card to enable movement of the door.

Card configurations 100b-d illustrates the door 120 opened at less than a ninety-degree angle, approximately a ninety-degree angle, and greater than a ninety-degree angle. The door 120 is rotatably connected to the card or portion thereof by a hinge. In one instance, the hinge can be a living hinge made from a thin section of the same material as the door 120 and a portion of the card it connects, such as plastic. Alternatively, several other hinges can be employed, including, but not limited to, spring, butt, ball bearing, barrel, offset, and piano hinges. In one instance, a torque or friction hinge can be utilized that provides resistance to a pivoting motion. In this case, the door 120 can be held in place through angles of motion, resisting movement until an external force is applied to angles until sufficient force is applied to overcome a threshold force. Further, a damping hinge can be employed that slows motion to allow a smooth and prevent slamming the door.

Opening the door 120 reveals payment information 130 on a layer below the door 120 that is not visible when the door is closed in card configuration 100a. The payment information can be printed or embossed on the card and include a cardholder name, card number, expiration date, and security code. As illustrated, the cardholder's name is "Bryant Yee," the card number is "3030 1337 1620 9999," the expiration date is "04/20", and the security code is "808." The door 120 in card configurations 100b-d can also provide a barrier to block the view or pictures of the payment information from at least one angle.

Card configuration 100e illustrates a situation in which the door 120 is fully open. In other words, the door 120 has rotated approximately one-hundred and eighty degrees from the closed position depicted in card configuration 100a. The door rests on top of the portion including the microchip 110 and fully exposes the payment information. In accordance with one embodiment, positioning the door 120 in the fully open position depicted can activate or make an integrated antenna available for contactless payment. For example, a first portion of an antenna can reside in the section including the payment information. A second portion of the antenna can be integrated within the door 120 such that rotation of the door connects the two antenna portions and renders the antenna available for use. By contrast, if the door 120 is in the closed or other positions, the antenna, and thus contactless transactions, can be unavailable.

Figure 2:
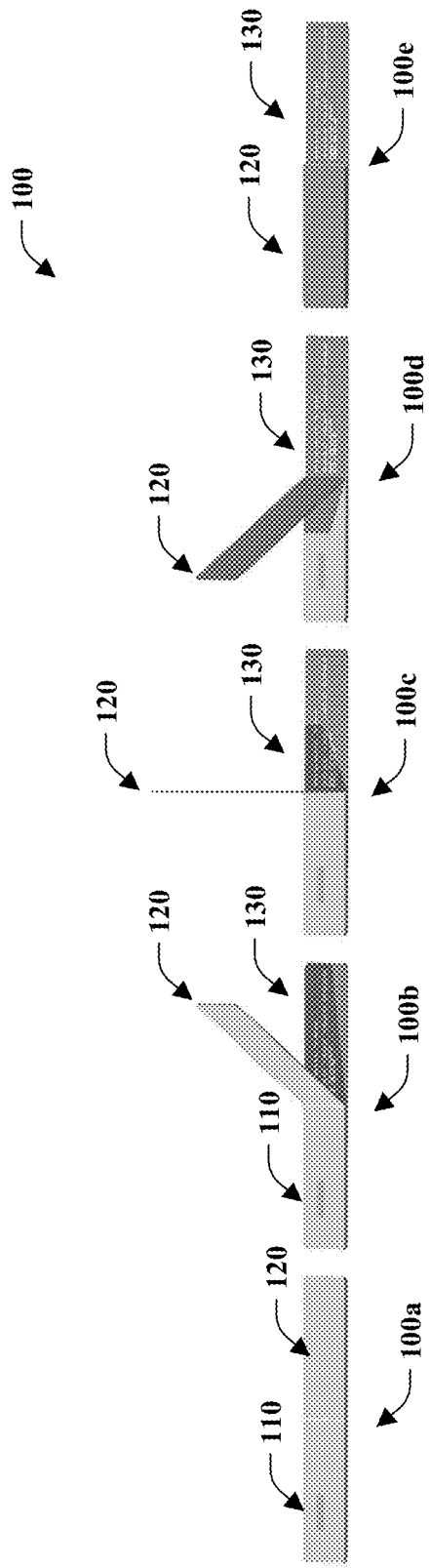
FIG. 2 depicts profile views of the payment card configuration shown in FIG. 1.

FIG. 2 illustrates a side or profile view of the payment card 100 with an integrated door 120 in various positions as depicted in FIG. 1 for further clarity and perspective. As shown, the payment card 100 includes five card configurations 100a-e with the integrated door 120 in various positions. In card configuration 100a, the door 120 is in a closed position substantially parallel to other layers of the payment card. The door 120 is in a separate portion of a top layer opposite the portion including the microchip 110. Further, the position of the door 120 covers or hides payment information 130 presented under or behind the door 120. Card configuration 100e illustrates a fully open door. Here, the door is rotated approximately one-hundred and eighty degrees and rests on top of the portion including the microchip 110, such that the microchip 110 is hidden from view. In addition, card configuration 100e exposes payment information 130, such as cardholder name, card number, expiration date, and security code, and optionally activates an antenna for contactless transactions. Card configurations 100b-d illustrate closed and fully open door positions. For example, card configuration 100b appears approximately forty-five degrees open, configuration 100c is approximately ninety degrees open, and card configuration 100d is about one-hundred and thirty-five degrees open.

Figure 3:
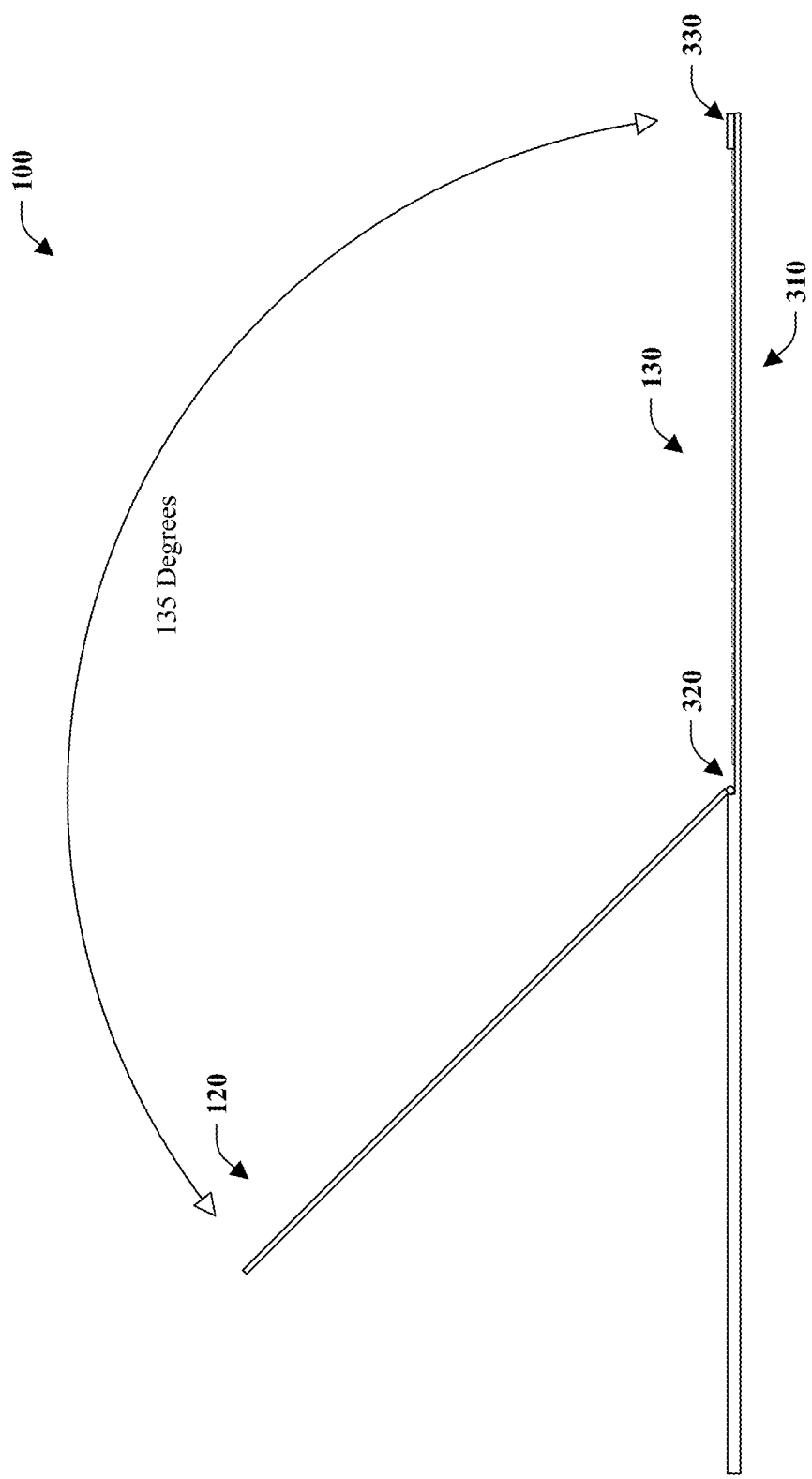
FIG. 3 illustrates a side view of a payment card with a hinged and open door.

FIG. 3 illustrates a side view of a payment card 100 with a hinged and opened door 120. The payment card 100 can include a substrate, core, or bottom layer 310 comprising a length, lengthwise edges, a width, and widthwise edges. In one instance, the bottom layer 310 can be a plastic such as polyvinyl chloride acetate (PVCA). The bottom layer 310 can also include a top face and bottom face. Provided on a portion of the top face is payment information 130. The payment information 130 can be printed on the top face or embossed. The payment card 100 can also include a hinge 320 that rotatably connects the bottom layer 310 or another layer of the payment card 100 to the door 120. The hinge can be one of a living hinge, torsion hinge, spring hinge, butt hinge, ball-bearing hinge, barrel hinge, offset hinge, or piano hinge, among others. The door 120 can be constructed from the same material as the bottom layer 310 or a different material. In one instance, the door 120 comprises a translucent material. In another instance, the door 120 can comprise a privacy material or screen over a clear material that narrows the visible area by allowing light to pass through the material only at certain angles. Content is viewable at such angles. Otherwise, the content is invisible. As shown, the door 120 is open one-hundred and thirty-five degrees exposing the payment information 130. When closed, however, the payment information can be hidden behind the door reducing the chances that a fraudster could acquire such information. In one instance, the thickness of the door 120 can be reduced overall or in portions to accommodate raised-ink or embossed payment information 130 to allow the door to sit flush with the bottom layer 310 when closed and maintain industry-standard card thickness.

The payment card 100 can also include a position securing mechanism or fastener in one embodiment. In one instance, the position securing mechanism can correspond to a closing mechanism to keep the door from unintentionally opening. Further, a closing mechanism can support using a spring hinge to prohibit the automatic opening of the door. The closing mechanism is depicted in FIG. 3 at numeral 330. However, the location, size, and material can vary for particular embodiments. In one instance, at least a portion of the closing mechanism can be affixed to the door 120. In one embodiment, the closing mechanism can be a latch. Accordingly, the addition of the mechanism can correspond to adding a bar or other structure to the door and a groove, catch, or hole into which the bar falls or slides. In another embodiment, the closing mechanism can use magnetism. A magnet and piece of metal or two magnets of opposite polarity can be employed. For example, a magnet can be attached to the inside surface of the door and interact with a portion of metal on the core under the door to remain closed. In another embodiment, an aperture or groove can be cut out of the bottom surface, and an extended portion of the door can be engaged with the aperture to remain closed. In yet another embodiment, Velcro (e.g., faster with two strips of fabric, one with fiber loops and one with fiber hooks) or similar material can be utilized to keep the door closed. A button, snap, or the like could also be utilized in accordance with yet further embodiments. Still, a weight can be added to the door such that the door is held closed by the weight. Furthermore, the position securing mechanism can also hold or fasten the door in a fully open position. Similar embodiments can be employed to secure that door in a fully open position as are used to fasten the door in a close position.

Figure 4:
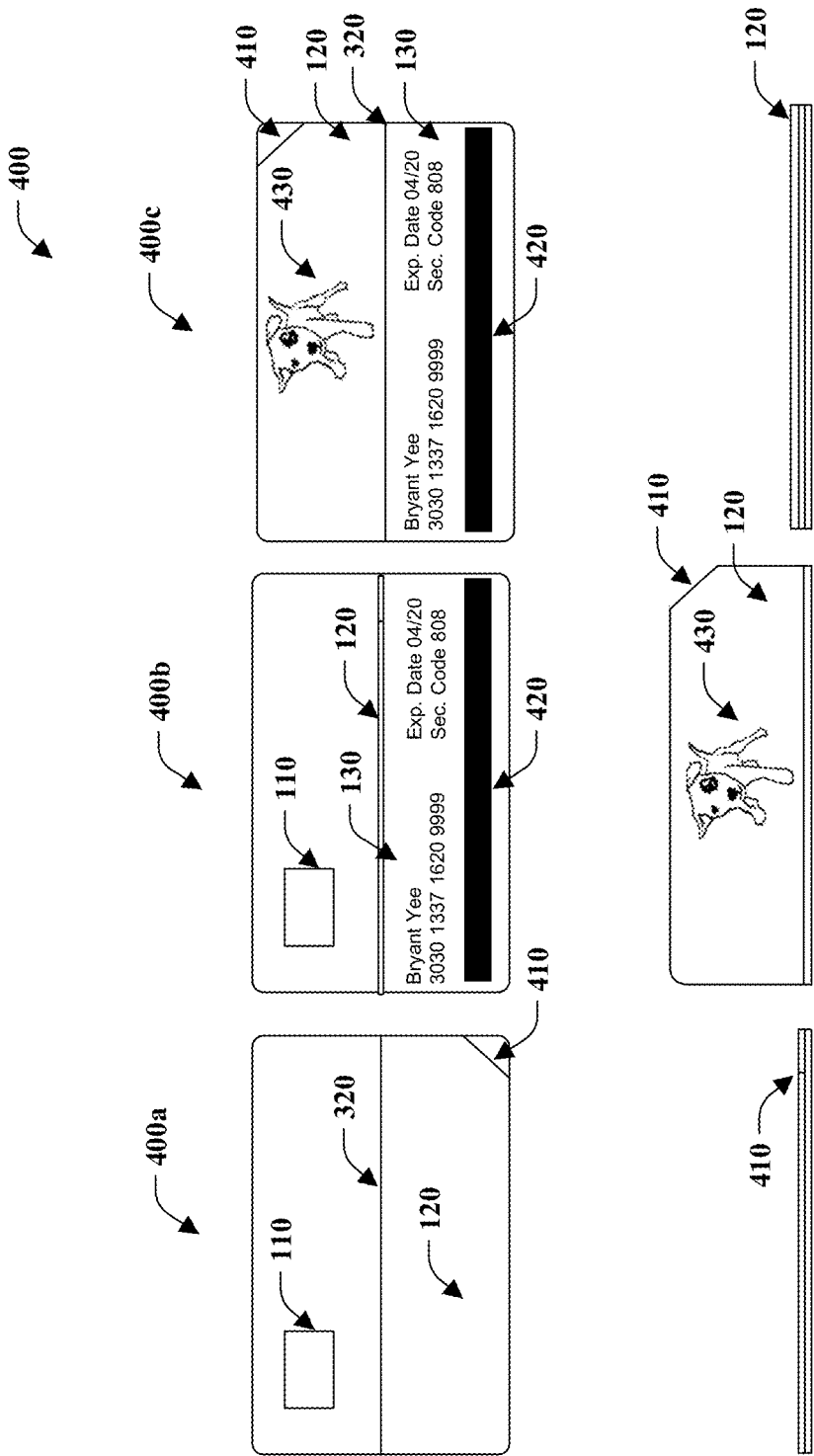
FIG. 4 depicts top and side views of a payment card with an integrated door in several configurations in accordance with one embodiment.

FIG. 4 depicts top and side views of an alternate embodiment of a payment card 400 with an integrated door 120 in various configurations. Card configuration 400a is a rectangular structure comprising a microchip 110 and a rotatably connected door 120. In this configuration, the door is in a closed position. Furthermore, per one embodiment, the door 120 can include a notch 410. The notch 410 is a cutout portion of the door 120 that indicates the door's presence and provides a means for lifting or opening the door with a finger or fingernail.

In card configuration 400b, the door can be rotated ninety degrees about an axis substantially in the middle of the width of the card. In accordance with one aspect, a hinge can be in the middle of the width of the card and span the length of the card or a portion thereof. Examples of the hinge include a living hinge, butt hinge, piano hinge, ball-bearing hinge, barrel hinge, and offset hinge.

Movement of the door 120 to a position perpendicular to the card's other features reveals payment information 130, including account holder name, account number, expiration date, and security code. In addition, the position of the door 120 reveals a magnetic stripe 420. The magnetic stripe 420 can store payment information readable by a payment device by modifying the magnetism of iron-based particles in the magnetic stripe 420. The payment information can correspond to the payment information 130 printed on the card, a subset, or a superset thereof. For example, the magnetic stripe 420 may encode a country code but not the card holder's name. Alternatively, the magnetic stripe 420 can encode payment information associated with a different account or card. In this manner, a single payment card can support payment with multiple cards. For example, a single card can include payment information associated with a debit and credit card or a personal and business credit card.

The movement also exposes the bottom surface of the door 120. The door can have a top surface and a bottom surface. When closed in configuration 400a, solely the top surface of the door is visible. Rotating the door ninety degrees reveals the bottom surface as well as the top surface of the door 120. The bottom surface provides a space for further information, pictures, and graphics, among other things. In this example implementation, the bottom surface of the door 120 includes an image 430 of a dog, which could be the card holder's pet, thereby personalizing the card. Alternatively, the bottom surface can include a mirror or other reflective surface, taking the place of a makeup pocket mirror, for instance. Furthermore, the bottom surface could include a magnetic strip including identifying or payment information similar to or as a replacement of magnetic stripe 420.

Card configuration 400*c* illustrates a situation in which the door 120 is fully open. In other words, the door 120 is rotated approximately one hundred and eighty degrees. In this position, the door's top surface and the top portion of the card, including the microchip 110, are hidden from view while the bottom surface is fully visible. The door 120 can rest on or be fastened into place on the top portion of the card, rendering that portion of the card thicker than the bottom portion from the side view.

Figure 5:
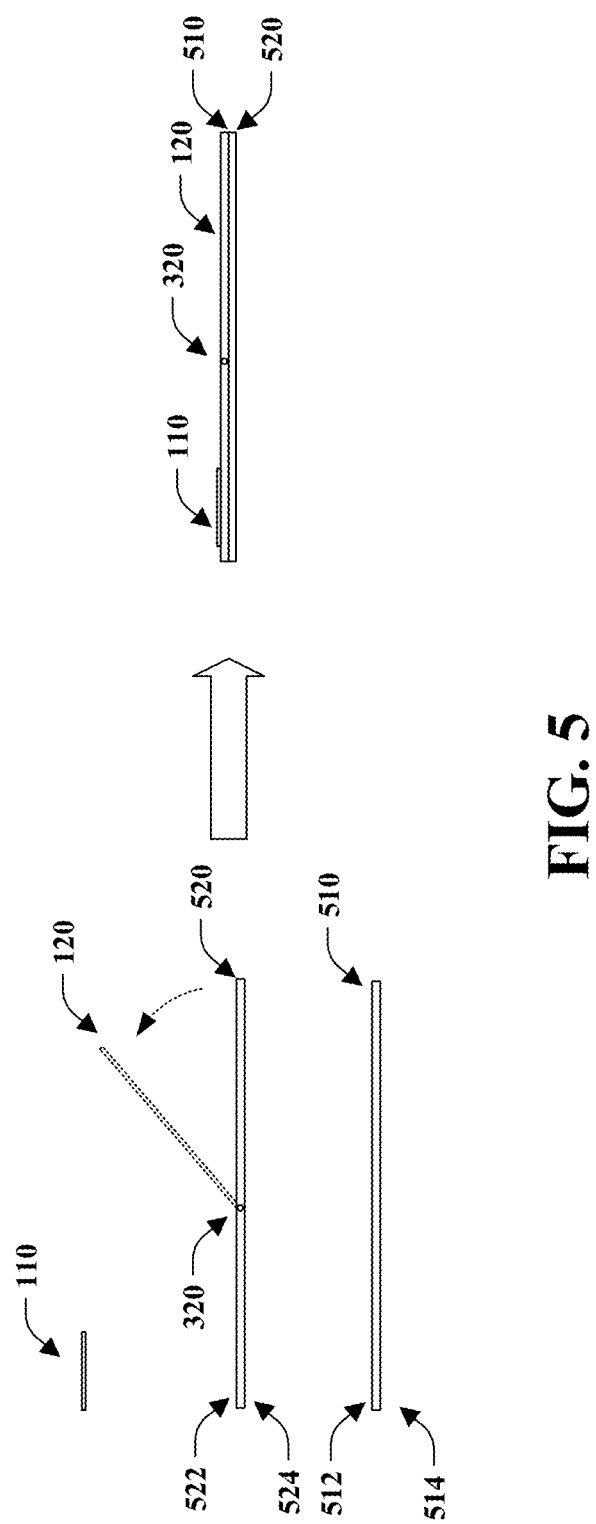
FIG. 5 illustrates side views associated with constructing an example payment card in accordance with one embodiment.

Turning attention to FIG. 5, a side view of component card parts and construction of a payment card is depicted in accordance with one example embodiment. The payment card can include first layer 510, second layer 520, and microchip 110.

The first layer 510 corresponds to a substrate or core of a payment card. The first layer 510 comprises a length, lengthwise edges, a width, and widthwise edges. More specifically, the first layer 510 can be a flat rectangular structure with rounded edges of a size typical of payment cards (e.g., 3.375 in×2.125 in). In one instance, the first layer 510 can be a plastic such as polyvinyl chloride acetate (PVCA). Alternatively, the first layer 510 can be metal or wood, among other things. The first layer can 510 can include a top surface 512 and a bottom surface 514. In one instance, the bottom surface 514 may comprise a magnetic stripe, and signature panel, among other things. The top surface 512 of the first layer 510 can also include payment information in text such as cardholder name, account number, expiration date, and security code. Further, the top surface 512 may include a magnetic stripe that encodes the payment information.

The second layer 520 includes a hinge 320 and door 120. The hinge can be substantially any hinge including, but not limited to, a living hinge, butt hinge, ball-bearing hinge, barrel hinge, offset hinge, or piano hinge. The hinge 320 rotatably couples the door 120 to a non-movable portion of the second layer 520. The hinge 320 allows the door 120 to lay flat and parallel to the first layer 510 in a closed position. In this configuration, the combination of the first layer 510 and the second layer 520 can correspond to a typical payment card thickness (e.g., 0.3 in). The hinge 320 can also permit the door 120 from the closed position to a fully open position with around one-hundred-and-eighty-degree rotation or anywhere between zero and one hundred and eighty degrees. In the fully open position, the door 120 can be positioned on top of and parallel with the non-movable portion of the second layer 520. In accordance with one embodiment, the hinge 320 can be positioned at approximately half the length or width of the payment card. In other words, the door can rotate lengthwise from right to left or left to right, or widthwise from top to bottom or bottom to top.

The microchip 110 provides an electronic means of securing transactions against fraud. The microchip 110 can communicate payment information to a payment terminal similar to a magnetic strip. However, the microchip can produce a unique code for each transaction, whereas the magnetic strip does not. The microchip thus makes it harder for a fraudster to produce counterfeit cards, at least because it is more difficult to produce a microchip with payment information and unique transaction code generation than to encode a magnetic stripe with payment information. Further, the microchip can store a personal identification number (PIN) to authenticate a user's identity. In other words, a cardholder may enter a PIN at a payment terminal for comparison with the information provided by the microchip 110 to determine whether the transaction is authorized. If someone steals a payment card, fraudulent purchases cannot be made unless the PIN is known.

In one embodiment, the functionality of the microchip 110 can be contactless by integrating an antenna into the second layer 520, first layer 510, or an intermediate layer (not shown) between the first layer and the second layer 520. A payment terminal can employ the antenna to communicate with the microchip 110 wirelessly. In one instance, the position of the door 120 can activate or deactivate the antenna or the ability to communicate wirelessly. For example, movement of the door 120 can cause an electrical connection can be established or broken. In one embodiment, a connection can be made when the door 120 is opened and broken when the door is closed.

The second layer 520 can be connected to the first layer 510, and the microchip 110 can be added to produce a payment card in accordance with an embodiment. In one instance, the second layer 520 can be attached or bonded to the first layer 510 through lamination or other processes. For example, a heat press can apply a large amount of pressure and elevated temperature to connect the layers. A hole can be made in the combined structure, and the microchip can be inserted into the hole. In accordance with another embodiment, the first layer 510 can include the fixed portion of the second layer 520, and the hinge and attached door can be affixed to the first layer 510.

Figure 6:
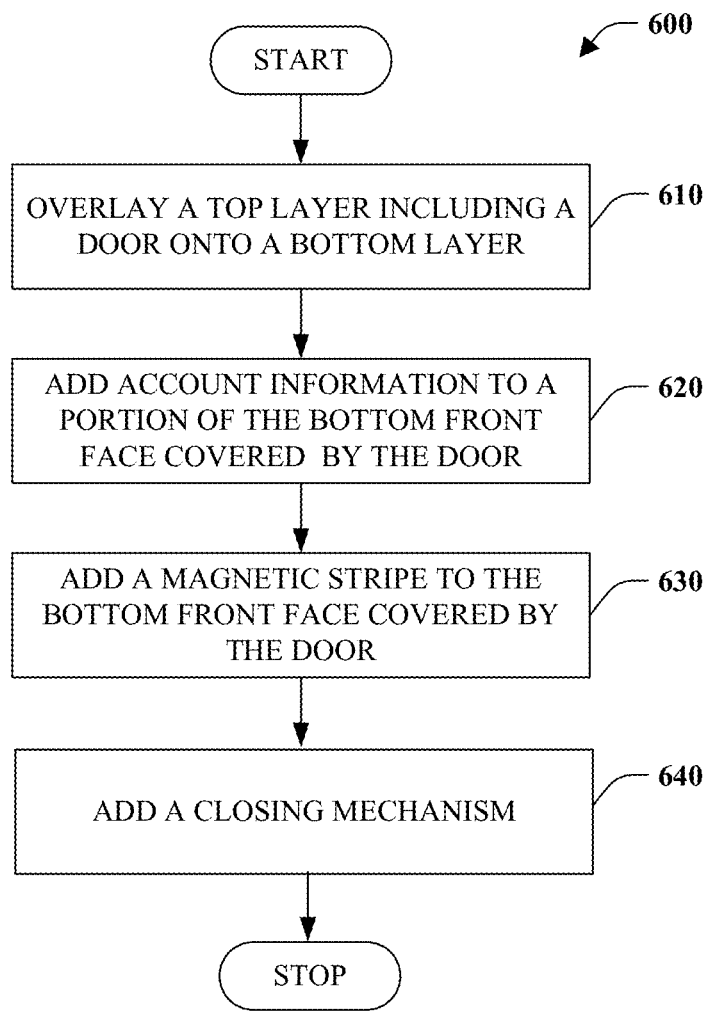
FIG. 6 is a flow chart diagram of a method of producing a payment card.
Figure 7:
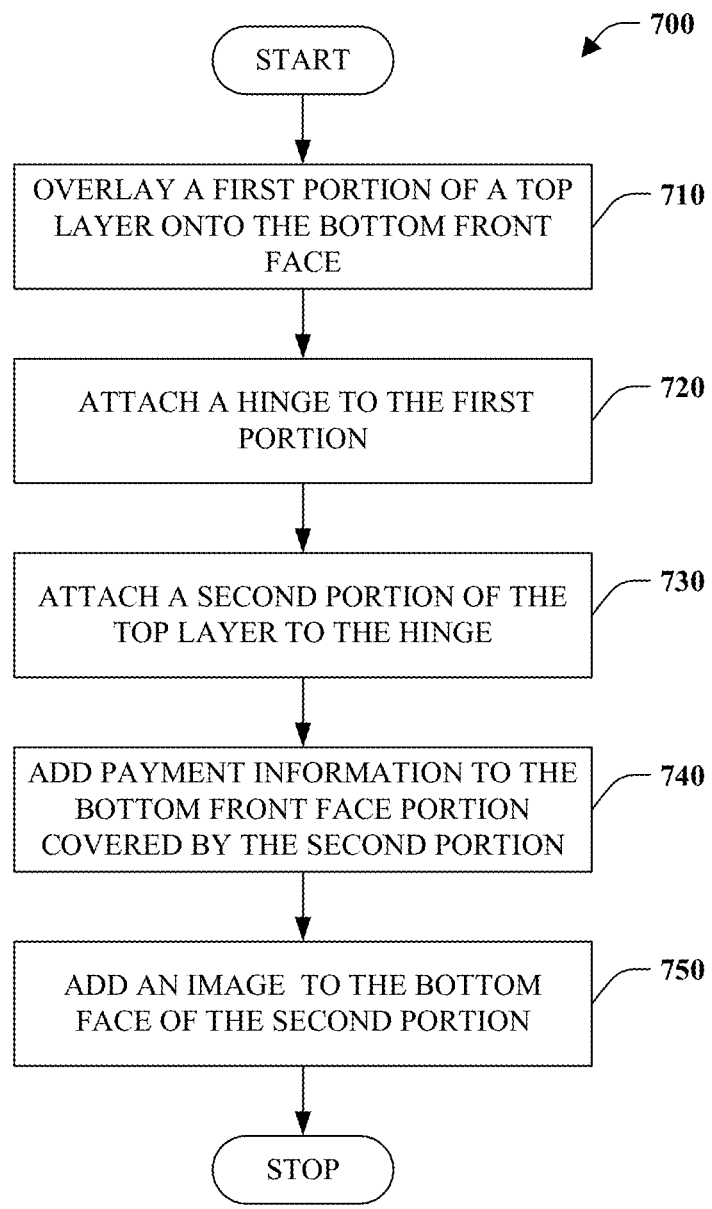
FIG. 7 is a flow chart diagram of a method of constructing a payment card.

In view of the example payment cards described above, methods that may be implemented in accordance with the disclosed subject matter will be better appreciated with reference to flow chart diagrams of FIG. 6 and FIG. 7. While, for purposes of simplicity of explanation, the methods show and describe a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Turning attention to FIG. 6, a method 600 of payment card production is illustrated in accordance with one embodiment. The method 600 can be performed to produce the payment cards 100 and 400 described herein, among other embodiments.

At 610, the method 600 overlays a top layer, including a door, onto a bottom layer. The bottom layer can correspond to a card substrate or core. For example, the bottom layer can correspond to a rigid or semirigid plastic or metal piece cut into a rectangular shape and size of a payment card before or after the overlay. The top layer can be affixed to the bottom layer such that it includes one or more hinges and a door attached to the one or more hinges to enable rotation. In other words, the door can be opened or closed. Per one embodiment, the top layer can include solely a hinge and a door such that the overlay involves attaching the hinge to the bottom layer. In accordance with another embodiment, the top layer can include a fixed portion, hinge, and door that can be affixed. The fixed portion can be attached to the bottom layer, and the hinge can couple the fixed portion and the door.

At 620, the method 600 adds payment information to a portion of the bottom layer covered by the door when the door is closed. The payment information can include account holder name, account number, expiration date, and security code. The payment information can be printed on the top face of the bottom layer. Alternatively, the payment information can be embossed on the portion of the bottom layer covered by the door.

At 630, the method 600 adds a magnetic stripe to the bottom layer. The stripe can be positioned on the bottom front face, covered by the door when closed. The stripe can encode a subset or superset of payment information visible as text on the top face. The magnetic stripe can include a second magnetic stripe in addition to a conventional stripe on the back of the card.

At 640, the method 600 adds a position securing mechanism, such as a closing mechanism. In one embodiment, the closing mechanism can be a latch. Accordingly, the addition of the mechanism can correspond to adding a bar or another structure to the door and a groove, catch, or hole into which the bar falls or slides. In another embodiment, the closing mechanism can use magnetism. A magnet and piece of metal or two magnets of opposite polarity can be employed. For example, a magnet can be attached to the inside surface of the door and interact with a portion of metal on the core under the door to remain closed. In another embodiment, an aperture or groove can be cut out of the bottom surface, and an extended portion of the door can be engaged with the aperture to remain closed. Utilizing a closing mechanism can be beneficial to keep the door from unintentionally opening. Further, the closing mechanism can support using a spring hinge to prohibit the automatic opening of the door. Of course, the closing mechanism can be optional. For example, a torsion or friction hinge would hold the door in a closed position without a separate closing mechanism. Additionally, a position securing mechanism can be employed to hold the door 120 in an open position, which can be embodied and operate similarly to a closing mechanism but prevent the door from being moved from a fully open position instead of a closed position.

FIG. 7 is a flow chart diagram of a method 700 of constructing a payment card including a door, in accordance with an aspect of this disclosure. Although not limited thereto, the payment card can correspond to payment card 100 or 400 as previously described.

At 710, the method 700 overlays a first portion of a top layer onto a bottom layer front face. The bottom portion can be a semirigid structure corresponding to a payment card substrate or core. Further, the bottom portion can comprise a length, parallel lengthwise edges, width, parallel widthwise edges, a bottom front face, and a bottom back face. The first portion of the top layer can be affixed to a portion of the bottom layer. For example, the first portion can correspond in size to half the length or half the width of the bottom layer. This first portion can then be attached or affixed to a corresponding part of the bottom layer, such as a left or right side or top or bottom portions. In one instance, the first portion of the top layer can be unremovable and unmovably attached to the bottom layer, for example, using a heat press.

At 720, the method 700 attaches a hinge to the first portion. The hinge can be substantially any hinge, including, but not limited to, a butt hinge, ball-bearing hinge, barrel hinge, offset hinge, piano hinge, or spring hinge. Further, the hinge can be a single hinge or multiple hinges. For example, a single hinge can extend the length of the first portion, or two hinges can be added toward the ends.

At 730, a second portion of the top layer is attached to the hinge. In this instance, the second portion can correspond to a door. The second portion can rotate about an axis of rotation relative to the first portion of the top layer and the bottom layer to which the first portion is attached. In one embodiment, the second portion can rotate approximately one hundred and eighty degrees from closed at zero degrees to fully open at one hundred and eighty degrees and partially open between zero and one hundred and eighty degrees. This second portion can be of similar thickness as the first portion, such that the first portion is substantially level with the first portion of the top layer when the second portion is closed. Further, in one embodiment, the combined thickness of the top layer and bottom layer can be of an industry-standard thickness (e.g., 0.03 in.).

At 740, the method 700 adds payment information to the bottom layer front face portion covered by the second portion when closed. Payment information can include a cardholder name, account number, expiration date, security code, or a subset thereof. The payment information can be printed or embossed on the front face of the bottom layer. Further, the payment information is positioned to be visible when the second portion is open and hidden when the second portion is closed.

At 750, the method 700 adds an image to the bottom face of the second portion. In other words, the underside of the second portion, or door, provides space that can be employed. This space can allow cardholders to customize their card. For example, the customer can have a picture of a family member or pet printed on the bottom face and revealed when the door is open. In this manner, the door can also function similarly to a locket. Of course, the space could be used for other things, including, but not limited to, a mirror or logo of a credit card company.

This disclosure pertains to the technical problem of securing electronic transactions made with a physical payment card. The technical solution comprises a payment card with an integrated rotatable door that hides payment information when closed and reveals payment information when open. More specifically, a door can be connected to a card core with a hinge that allows the door to move about an axis of rotation provided by the hinge relative to the card core. The payment card can include a notch or aperture that aids a user in opening the door. In one instance, the hinge can be a spring hinge that automatically opens the door when unlatched from a closed position. A magnetic stripe can also be included with payment information hidden by a closed door to allow a payment terminal to acquire information associated with a primary or secondary account. Furthermore, the rotational position of the door can connect and disconnect an antenna that enables contactless payment by way of radio frequency identification (RFID) or near field communication (NFC).

Disclosed embodiments herein relate to a payment card. Payment cards are issued by financial institutions, such as banks, to a customer that allows the card's owner or cardholder to access funds associated with a customer's account or a credit account to make payments electronically. Payment cards can also enable access to funds through automated teller machines (ATMs). However, the aspects disclosed above are not limited to traditional payment cards but can apply to any type of card containing information that would benefit from protecting the information from view. Accordingly, the aspects can also be associated with gift cards, identification cards, discount cards, membership cards, and access cards, among others.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having," or variations in form thereof are used in either the detailed description or the claims, such terms are intended to be inclusive in a manner similar to the term "comprising" as "comprising" is interpreted when employed as a transitional word in a claim.

What has been described above includes examples of aspects of the claimed subject matter. It is, of course, not possible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A payment card comprising:
   a bottom semirigid structure comprising a length, parallel lengthwise edges, width, parallel widthwise edges, a bottom front face, and bottom back face;
   payment information visually presented on a first portion of the bottom front face comprising a cardholder name, account number, expiration date, and security code;
   a top semirigid structure overlaid on the bottom front face, including a door within a portion of the top structure that is movable around a rotational axis from a closed position that covers the payment information to an open position that reveals the payment information; and
   a hinge between the top structure, the hinge comprising a spring that aids automatic opening of the door.

2. The payment card of claim 1, further comprising a closing mechanism, wherein the spring is configured to automatically open the door when the closing mechanism is released.

3. The payment card of claim 1, wherein the hinge is a living hinge.

4. The payment card of claim 1, wherein the spring is a torsion spring.

5. The payment card of claim 4, further comprising a closing mechanism that holds the door in the closed position.

6. The payment card of claim 5, wherein the closing mechanism is one of a latch, button, Velcro, or magnet.

7. The payment card of claim 1, wherein the door includes a weight to allow the door to stay in the closed position and the open position.

8. The payment card of claim 1, further comprising a first magnetic stripe on at least one portion of the bottom front face that is covered by the door when in the closed position.

9. The payment card of claim 8, further comprising a second magnetic stripe on the bottom back face.

10. The payment card of claim 9, wherein the first magnetic stripe and the second magnetic stripe include different payment information associated with a primary and secondary payment account.

11. The payment card of claim 4, further comprising an antenna associated that is activated for contactless interaction after movement of the door from the closed position to the open position.

12. A method of producing a payment card, the method comprising:
    affixing a top layer onto a bottom semirigid structure comprising a length, parallel lengthwise edges, width, parallel widthwise edges, bottom front face, and bottom back face, wherein the top layer includes a moveable door that rotates between an open position and a closed position;
    cutting, in an edge of the door, a notch for opening the door; and
    adding account information on a portion of the bottom front face covered by the door when in the closed position.

13. The method of claim 12, further comprising adding a magnetic stripe to the bottom back face.

14. The method of claim 13, further comprising adding a second magnetic stripe to the portion of the bottom front face.

15. The method of claim 12, further comprising coupling the door to a second portion of the top layer with a hinge.

16. The method of claim 12, wherein the notch allows a fingernail to open the door.

17. The method of claim 12, further comprising:
    adding an antenna to one of the top layer or the bottom structure for contactless communication; and
    adding an activation circuit to the door, wherein the activation circuit activates and deactivates the antenna based on a position of the door by connecting and disconnecting a circuit.

18. The method of claim 12, further comprising attaching a torsion hinge to a second portion of the top layer and the door.

19. A transaction card apparatus comprising:
    a bottom semirigid layer comprising a length, parallel lengthwise edges, a bottom front face, and a bottom back face;
    a top semirigid layer comprising a first portion attached to the bottom front face and a second portion that is attached to the first portion with a hinge that enables the second portion to rotate from a closed position that covers the bottom back face to an open position that reveals the bottom back face;
    a microchip; and
    an antenna coupled to the microchip and the second portion, wherein the antenna is operable to acquire or transmit information when the second portion is in the open position, and the antenna is inhibited from acquiring or transmitting information when the second portion is in the closed position.

20. The transaction card apparatus of claim 19, wherein the hinge comprises a spring that aids automatic rotation of the second portion.

* * * * *